Oct. 19, 1965  D. D. SCOTT  3,212,594
TILTABLE DISC-TYPE DRIVE WHEELS FOR VEHICLES
Filed April 30, 1963  6 Sheets-Sheet 1

INVENTOR
DONALD D. SCOTT

BY Claude Funkhouser
ATTORNEY
Cornelius J. Heeser
AGENT

Oct. 19, 1965     D. D. SCOTT     3,212,594
TILTABLE DISC-TYPE DRIVE WHEELS FOR VEHICLES
Filed April 30, 1963     6 Sheets-Sheet 2

| RESULTANT MOTION OF PLATFORM | ANGLE OF INCLINATION FROM Y AXIS | | | |
|---|---|---|---|---|
| | DISC "A" ROTATING COUNTER-CLOCKWISE | | DISC "B" ROTATING CLOCKWISE | |
| | $\lambda_{RA}$ | $\lambda_{LA}$ | $\lambda_{RB}$ | $\lambda_{LB}$ |
| NONE | 0 | 0 | 0 | 0 |
| FORWARD | $>0 = \lambda_{LB}$ | NA | NA | $>0 = \lambda_{RA}$ |
| AFT | NA | $>0 = \lambda_{RB}$ | $>0 = \lambda_{LA}$ | NA |
| CLOCKWISE ROTATION | NA | $>0 = \lambda_{LB}$ | NA | $>0 = \lambda_{LA}$ |
| COUNTER-CLOCKWISE ROTATION | $>0 = \lambda_{RB}$ | NA | $>0 = \lambda_{RA}$ | NA |
| RIGHT TURN | $<\lambda_{LB}$ | $>\lambda_{RB}$ | $<\lambda_{LA}$ | $>\lambda_{RA}$ |
| LEFT TURN | $>\lambda_{LB}$ | $<\lambda_{RB}$ | $>\lambda_{LA}$ | $<\lambda_{RA}$ |

NOTE: DISC "A AND B" ROTATE AT IDENTICAL SPEEDS
NA = NOT APPLICABLE

FIG. 4

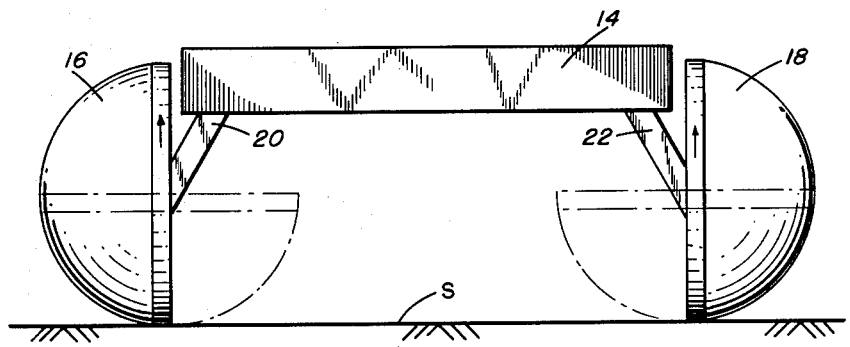

FIG. 5

| RESULTANT MOTION OF PLATFORM | ANGLE OF INCLINATION FROM Y AXIS | | | | | | | |
|---|---|---|---|---|---|---|---|---|
| | DISC "A" ROTATING COUNTER-CLOCKWISE | | | | DISC "B" ROTATING CLOCKWISE | | | |
| | $\lambda_{RA}$ | $\lambda_{LA}$ | $\theta_{FA}$ | $\theta_{AA}$ | $\lambda_{RB}$ | $\lambda_{LB}$ | $\theta_{FB}$ | $\theta_{AB}$ |
| NONE | 0 | 0 | 0 | 0 | 0 | 0 | 0 | 0 |
| FORWARD | $>0=\lambda_{LB}$ | NA | NA | NA | NA | $>0=\lambda_{RA}$ | NA | NA |
| AFT | NA | $>0=\lambda_{RB}$ | NA | NA | $>0=\lambda_{LA}$ | NA | NA | NA |
| RIGHT | NA | NA | NA | $>0=\theta_{FB}$ | NA | NA | $>0=\theta_{AA}$ | NA |
| LEFT | NA | NA | $>0=\theta_{AB}$ | NA | NA | NA | NA | $>0=\theta_{FA}$ |
| CLOCKWISE ROTATION | NA | $>0=\lambda_{LB}$ | NA | NA | NA | $>0=\lambda_{LA}$ | NA | NA |
| COUNTER-CLOCKWISE ROTATION | $>0=\lambda_{RB}$ | NA | NA | NA | $>0=\lambda_{RA}$ | NA | NA | NA |
| RIGHT TURN | $<\lambda_{LB}$ | $>\lambda_{RB}$ | NA | NA | $>\lambda_{LA}$ | $<\lambda_{RA}$ | NA | NA |
| LEFT TURN | $>\lambda_{LB}$ | $<\lambda_{RB}$ | NA | NA | $>\lambda_{LA}$ | $<\lambda_{RA}$ | NA | NA |

NOTE: DISCS "A AND B" ROTATE AT IDENTICAL SPEEDS
NA = NOT APPLICABLE

*FIG. 6*

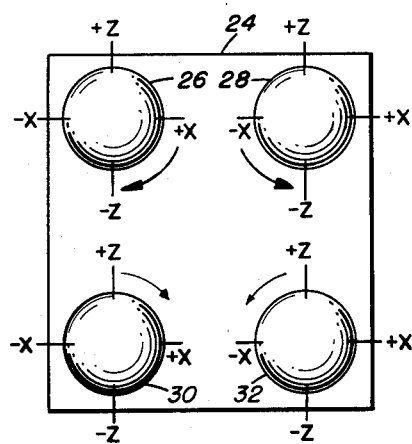

*FIG. 7*

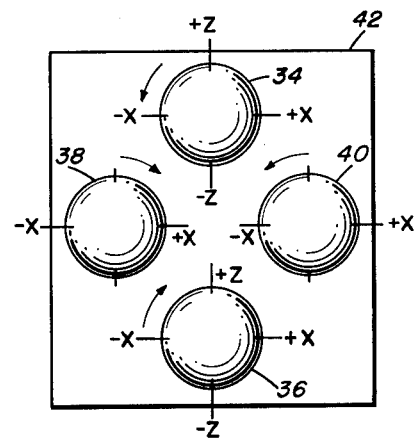

*FIG. 8*

Oct. 19, 1965 D. D. SCOTT 3,212,594
TILTABLE DISC-TYPE DRIVE WHEELS FOR VEHICLES
Filed April 30, 1963 6 Sheets-Sheet 6

United States Patent Office

3,212,594
Patented Oct. 19, 1965

1

3,212,594
TILTABLE DISC-TYPE DRIVE WHEELS FOR VEHICLES
Donald D. Scott, Silver Spring, Md., assignor to the United States of America as represented by the Secretary of the Navy
Filed Apr. 30, 1963, Ser. No. 277,061
5 Claims. (Cl. 180—7)

This invention relates generally to surface vehicles, and more particularly to improved apparatus for supporting and propelling a surface vehicle whereby it may move smoothly and at varying velocities in any of several given directions.

Conventional self-propelled surface vehicles are supported by a plurality of wheels which are mounted for rotation about axes that lie generally parallel to the surface upon which the vehicle rests. One or more of these wheels is rotated to cause movement of the vehicle, by the action of a motor applied through a suitable arrangement of gearing and clutch apparatus. Steering is provided by turning one or more of the wheels, thus causing the moving vehicle to proceed in a different direction. While these conventional wheeled vehicles have proved satisfactory for most applications, certain inherent limitations affect their usefulness in situations where very smooth operation with the ability to move over the surface in any of several directions from a given position is desirable.

The present invention contemplates supporting a vehicle by a plurality of discs which are rotated about normally vertical axes and which have bottom surfaces shaped in the form of a segment of the surface of a sphere. The discs are arranged in pairs, the discs comprising each pair being counter-rotating. By inclining the axes of rotation of the discs to various angles from the vertical and by utilizing different combinations of discs it has been found possible to cause the vehicle to move smoothly and at varying velocities in any of several given directions from an initial position. The smooth, universal directional vehicle movement obtainable from the invention is of value in numerous applications, such as for automatons, invalid wheel chairs, camera dollys for television and motion picture use, construction and farming equipment, pallet-moving vehicles for cramped industrial areas, and numerous similar situations where wheeled vehicles do not allow for the desired flexibility and smoothness of motion.

It is, accordingly, the principal object of this invention to provide apparatus for supporting and propelling a vehicle upon a surface, the apparatus being so constructed that the vehicle may move smoothly and at varying velocities in any of several possible directions from an initial position.

A further object of the invention is to provide a rotating disc for supporting a vehicle upon a surface, said disc being so constructed that it remains in one position when its axis of rotation is normal to said surface and that when said axis of rotation is inclined to said surface the disc will tend to move in a given direction.

It is also an object of this invention to provide apparatus for controlling the position of the axis of rotation of a rotating disc, said position controlling apparatus being so constructed that said axis of rotation may be moved smoothly in at least one plane from a vertical position through a relatively wide range of inclined positions.

Other objects and many of the attendant advantages of this invention will be readily appreciated as the same becomes better understood by reference to the following detailed description when considered in connection with the accompanying drawings, wherein:

FIG. 1 is a bottom perspective of a vehicle employ-

2 ing a pair of rotating discs constructed according to the invention;

FIG. 4 is a tabular listing of the resultant motion obtainable from the vehicle shown in FIG. 1 by inclining the axes of the counter-rotating discs to various angles within a single plane;

FIG. 5 is a front elevation of a vehicle incorporating a modified form of rotating disc, showing the degree to which the axis of rotation of the disc may be inclined if desired;

FIG. 6 is a tabular listing of the resultant motion obtainable from the vehicle shown in FIG. 1 by inclining the axes of the counter-rotating discs to various angles within two mutually perpendicular planes;

FIG. 7 is a bottom view showing one manner in which four rotating discs might be utilized on a vehicle;

FIG. 8 is a view similar to FIG. 7, showing another manner in which four rotating discs may be arranged upon a vehicle;

The present invention is directed to apparatus for supporting and propelling a vehicle upon a surface, and includes a plurality of rotating discs arranged in counter-rotating pairs, each disc being suspended from the vehicle by a normally vertical support which is coincident with the axis of rotation of the disc. The bottom surface of each disc is convex in shape and describes a segment of the surface of a sphere. Each disc support is pivotally secured at its upper end to the vehicle and is movable through a relatively wide angular range in at least one plane, the pivot point being so positioned that it lies at the center of the sphere of which the convex bottom of the disc is a part.

When the support carrying a disc is vertical, i.e., when the axis of rotation of that disc is vertical, the rotating disc will contact the surface upon which it rests only at one point, that point lying on the axis of rotation and hence being a "dead center." Thus, the disc will merely rotate and there will be no translational movement. If the support is pivoted whereby the axis for rotation of the disc is inclined to the vertical the convex surface of the sphere will be in contact with the surface upon which it rests at a point removed from dead center. A torque will thus be produced, which will cause translational movement of the disc. The further the support is inclined, the greater will be the distance from dead center to the point of contact with the surface, the greater will be the torque produced, and the greater will be the resultant translational velocity. The converse, of course, is also true; hence, by returning the support to a vertical position torque and its accompanying translational movement will be reduced to zero. In order to facilitate the maintenance of a dead center position for the disc in the present invention, an anti-friction bearing element is attached to the convex disc bottom on its axis of rotation.

The vehicle translational motion obtainable from a single rotating disc is difficult to control, the course followed by the vehicle being generally a spiral. However, if the rotating discs are employed in counter-rotating pairs it is possible by utilizing different combinations of positions for the discs to obtain almost any desired motion, including straight line and rotation about a single point. Moreover, the translational movement obtained is exceedingly smooth, and changes in velocity occur without jerkiness.

Figure 1:
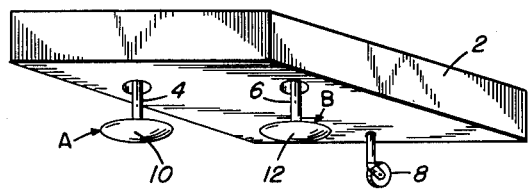

Referring now to the drawing, a vehicle including a platform 2 is shown in FIG. 1, said platform having a pair of discs A and B attached thereto, the discs being mounted on the lower ends of a pair of supports 4 and 6, respectively. A caster wheel 8 is attached to the platform 2, and it together with the two discs A and B serve to support the platform upon a surface.

Figure 2:
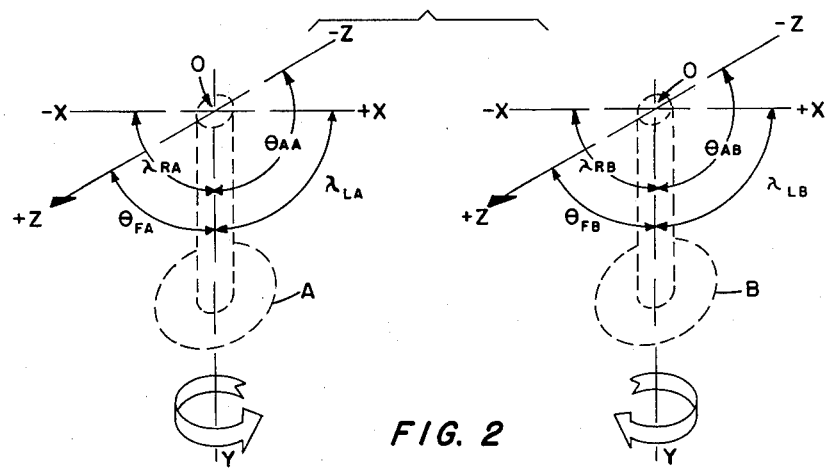
FIG. 2 is a diagrammatic view showing the planes through which the axes of rotation of a pair of counter-rotating discs may be moved to obtain various directions of vehicle movement.
Figure 3:
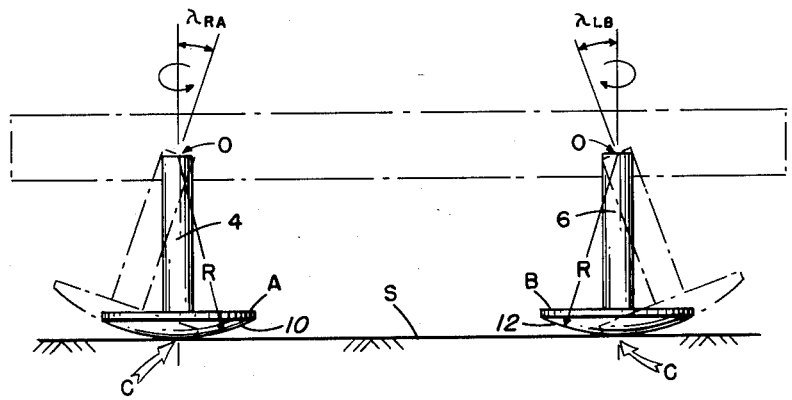
FIG. 3 is a view showing in diagrammatic form the manner in which the axes of rotation of a pair of counter-rotating discs are inclined to obtain forward movement.

The discs A and B, as is best shown in FIGS. 2 and 3, rotate in opposite directions about their respective axes of rotation. The bottom surfaces 10 and 12, respectively, of discs A and B are convex and define a segment of the surface of a sphere, the radius of the sphere, indicated by R in FIG. 3, being the same for both discs. The axis of rotation of each disc passes through the center 0 of its respective sphere, and the disc's support is mounted on the platform 2 in such a manner that it may be pivoted about the center 0 of said sphere whereby to incline said axis of rotation relative to the vertical.

The manner in which the supports 4 and 6 pivot is shown diagrammatically in FIG. 2, wherein for each support the vertical is indicated by the Y axis, forward and aft by the Z axis, and right and left by the X axis. The supports are so mounted that they may pivot in at least one plane, and preferably in two planes, the planes in the latter instance being mutually perpendicular. Referring again to FIG. 2, pivoting motion for each support is possible in the Z—Y plane and in the X—Y plane, and the resultant angles of inclination from the Y axis for each support are identified as follows:

$$+Z-Y \text{ plane} = \theta_{FA}, \theta_{FB}$$
$$-Z-Y \text{ plane} = \theta_{AA}, \theta_{AB}$$
$$+X-Y \text{ plane} = \lambda_{LA}, \lambda_{LB}$$
$$-X-Y \text{ plane} = \lambda_{RA}, \lambda_{RB}$$

where the second letter of each subscript identifies the disc, A or B, to which the angle relates.

The manner in which the discs A and B are tilted to obtain translation movement of the platform 2 is illustrated in FIG. 3, which is a view in front elevation with the platform being shown in phantom lines. The discs A and B are oppositely rotating at constant, identical speeds, the axis of rotation of each disc initially being coincident with the Y axis. The discs are in contact with the surface S at points of contact C thereon, which points are also positioned on the Y axes. When the disc supports are vertically oriented as in FIG. 3 the point on the convex surface of each disc which contacts surface S at point C is the dead center position on said disc. When the discs are in this dead center position they create no torque component, and hence no resultant motion of the vehicle occurs.

When it is desired to cause the platform 2 to move in the forward, or +Z, direction the supports are inclined to the Y axis at identical angles $\lambda_{RA}$ and $\lambda_{LB}$, respectively, thus tilting the discs to the positions indicated by broken lines in FIG. 3. The convex surfaces of discs A and B then contact with surface S at positions thereon which are removed from the dead center position, and accordingly the revolving motion of the discs acts to create a torque. Because discs A and B rotate oppositely their respective torque outputs cooperate to exert a force causing translation of platform 2 forward along the +Z axis. The larger the $\lambda_{RA}$ and $\lambda_{LB}$ angles become the greater will be the distance between point C and dead center on each disc, and accordingly the greater will be both the torque produced and the velocity of the platform. It is also readily seen that by reducing the size of the $\lambda_{RA}$ and $\lambda_{LB}$ angles progressively to zero forward motion of the platform will continuously lessen until it, too, becomes zero.

The principle of operation just set forth for forward motion is applicable for motion in other directions as well. While it is desirable for full flexibility of motion to utilize discs that can be tilted in both the Z—Y and the X—Y planes, for many applications tilting action in one of these planes is sufficient. For example, assume that the axis of rotation of discs A and B of the vehicle shown in FIG. 1 can be inclined only in the X—Y plane. The tabular listing in FIG. 4 indicates resultant platform movements that can be obtained by imposing various combinations of $\lambda_{RA}$, $\lambda_{LA}$, $\lambda_{RB}$ and $\lambda_{LB}$ angles, assuming both discs are identical in size and configuration and are counter-rotating in the direction indicated at identical speeds. For the two-disc vehicle of FIG. 1 the caster wheel 8 or some similar construction, is desirable to maintain the platform stability. However, all driving forces are exerted solely by the discs A and B.

The degree to which the axes of rotation of the discs can be inclined to the vertical is limited only by the design of the device, and in some instances it may be desirable to utilize a full 90° inclination. Such a construction is shown in FIG. 5, wherein a platform 14 is supported by a pair of hemispherical-shaped, counter-rotating discs 16 and 18, said discs being mounted on inclined supports 20 and 22, respectively. The initial dead center, or no motion positions of discs 16 and 18 are indicated by broken lines. The discs may be inclined in the same manner as discs A and B of FIG. 1 to permit all the directions of movement listed in the table of FIG. 4. Additionally, the discs 16 and 18 may be inclined until their axes of rotation are parallel to the surface S, at which point they function as common wheels. Thus, the construction of FIG. 5 combines the universal directional movement advantages of the tilting disc concept of the present invention with the advantages of the common wheel.

While it has been demonstrated that inclination of the axes of rotation of the discs in only one plane will give most commonly desired directions of platform movement, even greater flexibility is possible when inclination in both the X—Y and Z—Y planes is possible. The tabular listing of FIG. 6 indicates resultant platform movements obtainable when inclination in these two mutually perpendicular planes is permitted.

While two counter-rotating discs are adequate for most situations, it is also to be understood that more than one pair of discs may be utilized. FIGS. 7 and 8 indicate possible arrangements for using two pairs of counter-rotating discs. In FIG. 7 a platform 24 is shown in bottom view, and includes four discs 26, 28, 30 and 32, said discs being arranged in a rectangle in counter-rotating pairs. Similarly, in FIG. 8 four discs 34, 36, 38 and 40 are arranged in counter-rotating pairs to form a diamond upon a platform 42. The use of four discs eliminates the need for a caster wheel arrangement, provides greater flexibility of movement, and enables the application of greater propelling force for moving large loads.

The specific structure of a tilting disc assembly is principally a matter of design dependent upon the requirements for a particular vehicle. However, for purposes of illustrating the principles involved in an actual assembly reference is now made to FIGS. 9–13, wherein the construction of a typical tilting disc assembly capable of inclining movement in one plane is shown in detail.

Figure 9:
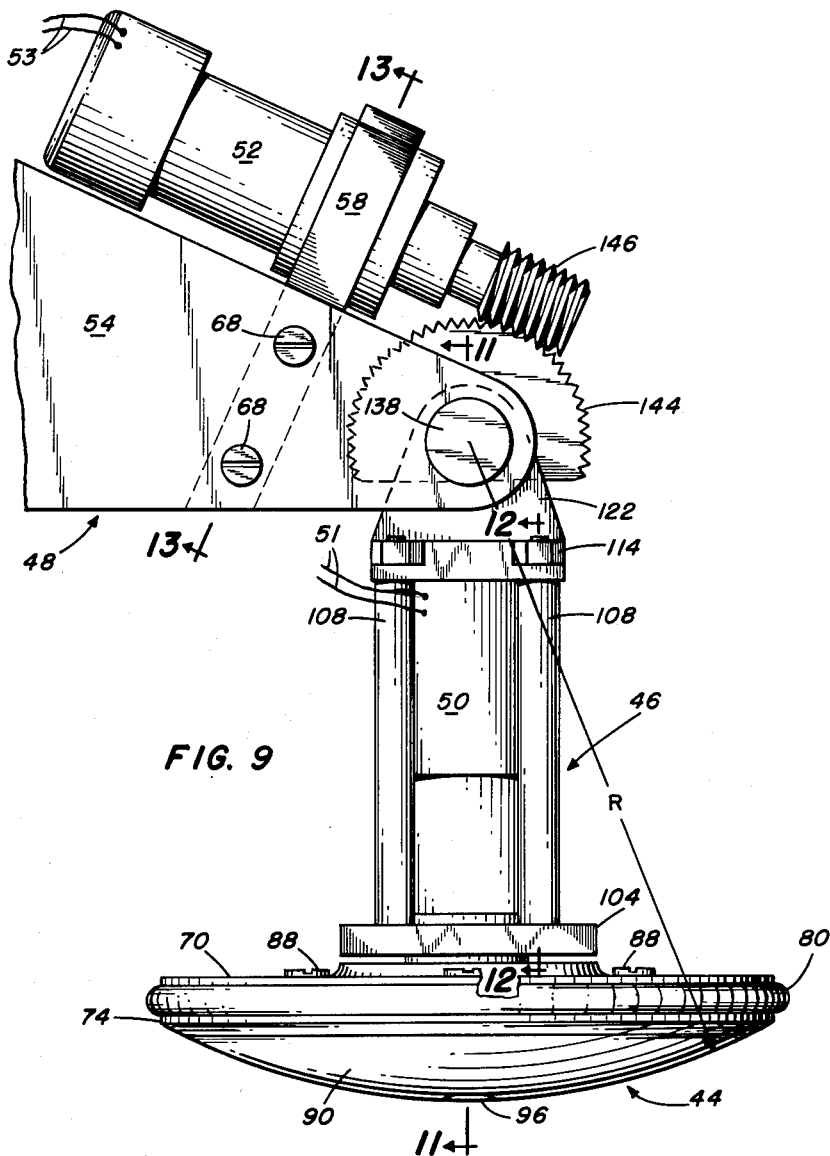
FIG. 9 is a side elevation of a rotating disc assembly constructed according to the invention.
Figure 10:
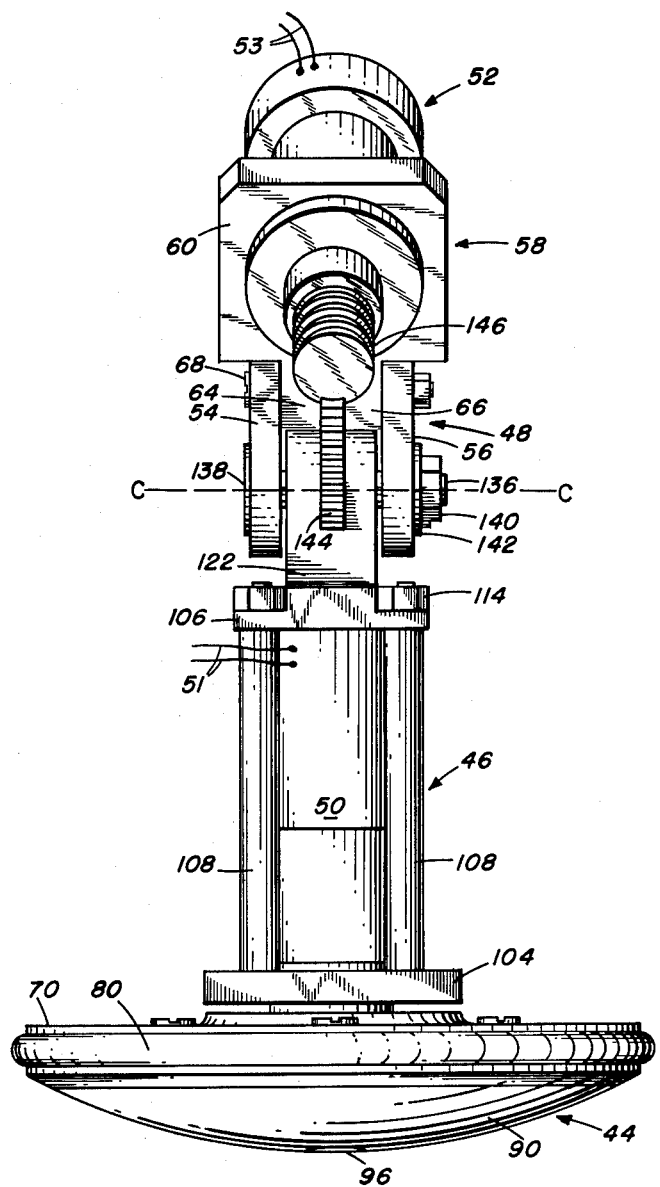
FIG. 10 is an end elevation of the disc assembly shown in FIG. 9.
Figure 13:
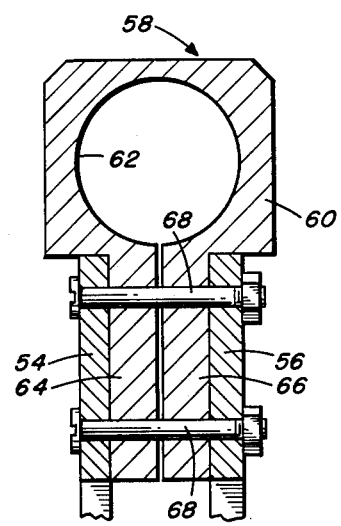
FIG. 13 is a section taken on line 13—13 in FIG. 9, showing the clamp employed to secure the axis-inclining motor in position.

The assembly of FIG. 9 includes a rotating disc 44, a vertical support 46 which is pivotally attached to a frame 48, and a pair of electric motors 50 and 52, the motor 50 serving to rotate the disc 44 and the motor 52 being connected through suitable gears to tilt support 46. The frame 48 is attached to the chassis of a suitable vehicle (not shown), and includes a pair of side plates 54 and 56 (FIGS. 10 and 13). The tilting motor 52 is secured to the frame 48 by a clamp 58, said clamp including a body portion 60 having an opening 62 therein of a size to receive the forward end of motor 52, and a pair of generally parallel, slightly separated legs 64 and 66. The legs 64 and 66 extend between side plates 54 and 56 and are secured thereto by bolts 68 which pass through aligned bores in said side plates and said legs. The bolts 68 function to secure the side plates and the clamp 58 in position, and to cause said clamp to tightly grip the motor 52.

It is to be noted that both driving motors 50 and tilting motors 52 are reversible in their direction of rotation and are connected by leads 51 and 53, respectively, to a source of power and proper switches. Although the power source is not shown it is to be understood that various hook-up arrangements could be employed to effect the desired reversibility and control of the vehicle.

Figure 11:
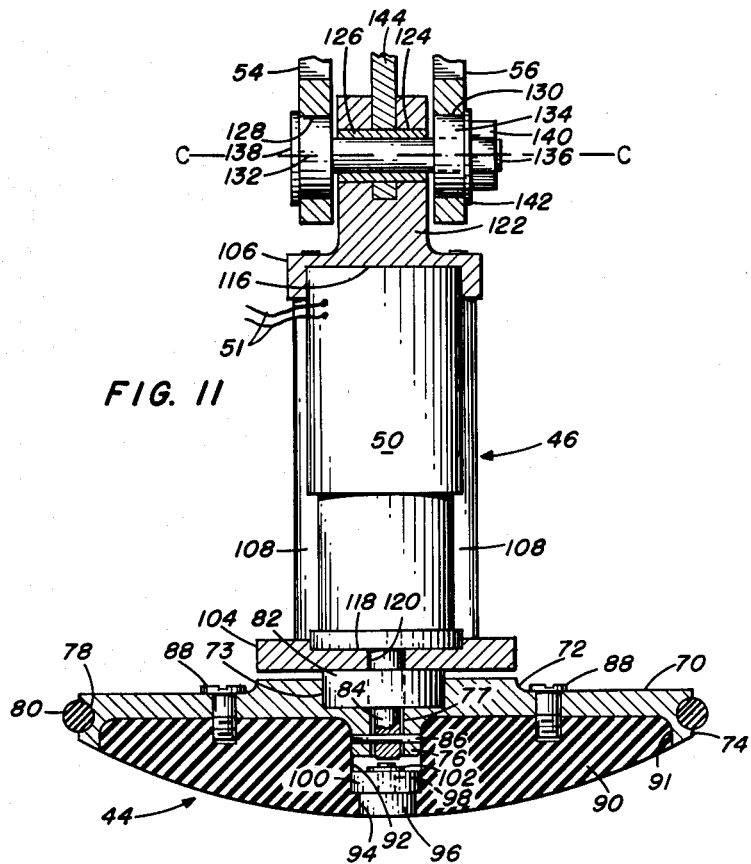
FIG. 11 is a detail section on line 11—11 in FIG. 9, showing the construction of the rotating disc and its supporting structure.

The details of the disc 44 are best shown in FIG. 11, and include a circular base plate 70 having a central hub portion 72, an axially projecting rim 74, and a centrally-disposed axial projection 76. The outer periphery of the plate 70 has an annular groove 78 therein within which is disposed an annular resilient ring 80 of circular cross-section, and the hub portion 72 has a socket 73 therein for reception of a bearing unit 82. The projection 76 has an annular bore 77 therethrough for receiving the shaft 84 of motor 50, said shaft being secured to the plate 70 by a tight-fitting pin 86 disposed in aligned openings in the projection 76 and the shaft 84.

Secured to the plate 70 by screws 88 is a shoe 90 of resilient material, said shoe having a diameter slightly smaller than the inner diameter 91 of rim 74 and having a relatively large central bore portion 92 of a diameter sufficient to receive projection 76. The shoe 90 also has a relatively small central bore 94, which is concentric with bore 92, within which is received a round metallic button 96 having an integral shaft 98 projecting upwardly therefrom. The bore 92 is of greater axial length than projection 76, and a bearing unit 100 is disposed therein and rests upon the radial wall extending between said bore 92 and smaller bore 94. Shaft 98 projects through bearing unit 100, and the button is secured in position by a snap ring 102 engaged in a groove near the upper end of said shaft.

Figure 12:
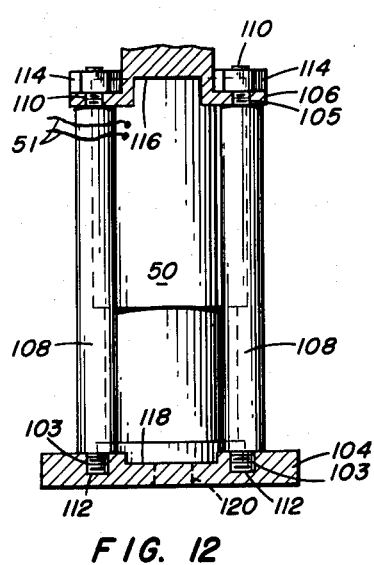
FIG. 12 is a section taken on line 12—12 in FIG. 9, showing the construction of the disc motor supporting structure.

Support 46 functions to connect the disc 44 with the frame 48, and includes a bottom plate 104, a top plate 106, and four connecting thrust rods 108, said rods 108 having reduced diameter threaded portions 110 and 112 at their upper and lower ends, respectively. The ends 112 are threaded into bores 103 in bottom plate 104, and the ends 110 extend through bores 105 in top plate 106 and have nuts 114 threaded thereon (FIG. 12). The top and bottom plates have recesses 116 and 118 therein, respectively, of a size to receive the opposite ends of motor 50, said motor being clamped in position by said plates and the cooperating rods 108. Bottom plate 104 has a bore 120 therein through which shaft 84 of the motor 50 extends.

Top plate 106 of support 46 has an integral projecting head 122 thereon which has a transverse bore 124 extending therethrough, said bore having a tightly fitting bushing 126 therein. Side plates 54 and 56 have aligned openings 128 and 130 therein positioned to confront bore 124, said openings 128 and 130 having bearing units 132 and 134, respectively. A pivot bolt 136 having an enlarged head 138 thereon is passed through bearings 132 and 134 and bushing 126 and functions to pivotally connect the support 46 to frame 48, said bolt 136 being secured in position by a nut 140 and a washer 142. A generally semi-circular gear segment 144 is secured to head portion 122, and meshes with a worm gear 146 secured to the shaft to tilt motor 52. Thus, rotation of the shaft of motor 52 causes gear 146 to rotate, which gear then acts upon gear segment 144 to cause the support 46 to pivot about the central axis C—C of pivot bolt 136.

The bottom surfaces of shoe 90 and rim 74 are shaped to define a segment of a sphere, the center of said sphere lying on the axis C—C (as indicated by the dimension R in FIG. 9). The bottom surface of button 96 also is shaped as a portion of the same sphere. The button 96 serves solely as a bearing to insure that when the axis of rotation of the disc is vertical its "dead center" condition will be maintained.

The electric motors 50 and 52 are supplied with electricity, by means of leads 51 and 53, respectively, and are controlled from a remote point, the tilt motor 52 being capable of motion either clockwise or counterclockwise whereby to tilt the disc in either direction about the axis C—C.

It is to be understood that the disc assembly of FIGS. 9–13 is only illustrative, and that other constructions could be utilized without departing from the inventive concept of utilizing pairs of counter-rotating discs to support and propel a vehicle upon a surface. By way of example of other possible constructions, the disc motor 50 could be removed from support 46 and the disc could then be driven by a flexible shaft, and hydraulic cylinder means could be substituted for the tilt motor 50.

Obviously, many modifications and variations of the present invention are possible in the light of the above teachings. It is therefore to be understood that within the scope of the appended claims the invention may be practiced otherwise than as specifically described.

What is claimed is:

1. An apparatus for supporting and propelling a vehicle upon a surface, said apparatus comprising:

a vehicle frame;
   a plurality of support means extending from and pivotally connected to said frame, said support means comprising a top and bottom plate each having a recess therein and separated a predetermined distance by a plurality of tension rods, said tension rods being connected at opposite ends thereof to said top and bottom plates, and connecting means for pivotally attaching said top plate to said frame;
   tilting means attached to said frame and cooperating with said support means to vary the angle of said support means in at least one plane, said tilting means comprising a motor fixedly secured to said frame, said motor having a worm gear attached to its driving end, and a semi-circular gear fixedly secured to said top plate in such a manner that said worm gear engages said semi-circular gear;
   a plurality of rotatable discs;
   rotation means mounted within said support means and operably connected to said discs for rotating the same;
   mounting means for rotatably attaching one of said discs to the lower end of each of said support means;
   said discs being arranged in counter rotating pairs, whereby said vehicle may be propelled at varying velocities in any of several directions depending upon the angle of tilt of said discs with respect to said vehicle frame.

2. In an apparatus of the character described in claim 1 wherein:

each of said rotatable discs comprises a circular base plate;
   a centrally located recess in said base plate and an aperture extending through said base plate;
   a centrally located projection extending from the bottom of said base plate;
   a flange extending downwardly from the outer periphery of said base plate;
   a friction shoe mounted in the underside of said base plate;
   said friction shoe having an outer surface shaped to define a segment of the surface of a sphere;

a first aperture in said friction shoe which is in alignment with and receives said centrally located projection flange;

a second aperture in said friction shoe which is of lesser diameter than said first aperture;

a metallic button mounted in said second aperture to provide contact with the surface when said disc is in its vertical position.

3. In an apparatus of the character described in claim 2 wherein:

said rotation means comprises a motor which is mounted between said top and bottom plates;

said motor having a driving shaft which extends into said aperture in said base plate.

4. In an apparatus of the character described in claim 3 wherein:

said mounting means for rotatably attaching one of said discs to said support consists of a bearing in said aperture in said base plate which receives said shaft;

a pin which extends through said downwardly extending projection of said base plate and also said drive shaft;

whereby energizing said motor rotates said drive shaft and imparts rotation to said disc thereby propelling said vehicle in the desired direction when said disc is adjusted to the proper angle.

5. In a device of the character described in claim 3 wherein:

said tilting end rotation motors are reversible.

References Cited by the Examiner

UNITED STATES PATENTS

| | | | |
|---|---|---|---|
| 2,612,230 | 9/52 | Jezler | 180—1 |
| 3,001,601 | 9/61 | Aghnides | 280—64 X |

FOREIGN PATENTS

| | | |
|---|---|---|
| 512,471 | 7/52 | Belgium. |
| 514,711 | 11/20 | France. |
| 604,248 | 1/26 | France. |

BENJAMIN HERSH, *Primary Examiner.*

LEO FRIAGLIA, *Examiner.*